United States Patent
Song et al.

(10) Patent No.: US 11,794,446 B2
(45) Date of Patent: Oct. 24, 2023

(54) GLASS SUBSTRATE MULTILAYER STRUCTURE, A METHOD FOR MANUFACTURING THE SAME, AND A DISPLAY PANEL INCLUDING THE SAME

(71) Applicants: SK Innovation Co., Ltd., Seoul (KR); SK ie technology Co., Ltd., Seoul (KR)

(72) Inventors: Hyun Joo Song, Daejeon (KR); Cheol Min Yun, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

(21) Appl. No.: 17/849,891

(22) Filed: Jun. 27, 2022

(65) Prior Publication Data

US 2022/0410527 A1    Dec. 29, 2022

(30) Foreign Application Priority Data

Jun. 28, 2021  (KR) .................. 10-2021-0083965

(51) Int. Cl.
| | | |
|---|---|---|
| B32B 27/28 | (2006.01) | |
| B32B 7/02 | (2019.01) | |
| B32B 27/30 | (2006.01) | |
| B32B 17/10 | (2006.01) | |
| B32B 27/26 | (2006.01) | |
| B32B 38/00 | (2006.01) | |

(52) U.S. Cl.
CPC ............... *B32B 7/02* (2013.01); *B32B 17/10* (2013.01); *B32B 27/281* (2013.01); *B32B 27/308* (2013.01); *B32B 27/26* (2013.01); *B32B 2038/0076* (2013.01); *B32B 2250/02* (2013.01); *B32B 2255/10* (2013.01); *B32B 2255/26* (2013.01); *B32B 2270/00* (2013.01); *B32B 2307/3065* (2013.01); *B32B 2307/536* (2013.01); *B32B 2307/732* (2013.01); *B32B 2457/20* (2013.01); *B32B 2605/00* (2013.01)

(58) Field of Classification Search
CPC ....... B32B 7/02; B32B 27/281; B32B 27/308; B32B 27/26; B32B 2250/02; B32B 2255/10; B32B 2255/26; B32B 2307/536; B32B 2457/20; B32B 2605/00
USPC ........................................ 428/1.33, 1.6, 1.62
See application file for complete search history.

(56) References Cited

U.S. PATENT DOCUMENTS

| | | | |
|---|---|---|---|
| 6,815,070 B1 | 11/2004 | Burkle et al. | |
| 11,161,323 B2 | 11/2021 | Choi et al. | |
| 2016/0075110 A1* | 3/2016 | Kakuta | ............. B32B 7/06 156/247 |
| 2021/0403769 A1* | 12/2021 | Kiyoto | ............. C09J 5/00 |

FOREIGN PATENT DOCUMENTS

| | | |
|---|---|---|
| JP | 6350163 B2 | 7/2018 |
| KR | 100489727 B1 | 5/2005 |
| KR | 1020160117867 A | 10/2016 |
| KR | 1020170113815 A | 10/2017 |
| KR | 1020200049942 A | 5/2020 |

* cited by examiner

*Primary Examiner* — Ruiyun Zhang
(74) *Attorney, Agent, or Firm* — THE WEBB LAW FIRM

(57) ABSTRACT

Provided are a glass substrate multilayer structure including a glass substrate; a polyimide-based shatter-proof layer formed on one surface of the glass substrate; and a hard coating layer formed on the polyimide-based shatter-proof layer. The polyimide-based shatter-proof layer has a thickness of 5 to 50 μm, the hard coating layer has a thickness of 5 to 20 μm, and the glass substrate multilayer structure has a retardation in a thickness direction ($R_{th}$) of 200 nm or less. A method for manufacturing the glass substrate multilayer structure, and a display panel including the glass substrate multilayer structure are also provided.

16 Claims, No Drawings

GLASS SUBSTRATE MULTILAYER STRUCTURE, A METHOD FOR MANUFACTURING THE SAME, AND A DISPLAY PANEL INCLUDING THE SAME

CROSS-REFERENCE TO RELATED APPLICATION

This application claims priority to Korean Patent Application No. 10-2021-0083965 filed Jun. 28, 2021, the disclosure of which is hereby incorporated by reference in its entirety.

BACKGROUND OF THE INVENTION

Field of the Invention

The following disclosure relates to a glass substrate multilayer structure, a method for manufacturing the same, and a display panel including the same.

Description of Related Art

Recently, thin display devices using a flat panel display device such as a liquid crystal display device or an organic light emitting diode display device are drawing a lot of attention.

In particular, these thin display devices require thinning with the development of the display device, and are implemented in the form of a touch screen panel to be widely used in LCD and LED display devices and the like mounted on means of transportation such as vehicles, trains, and aircraft.

The display device includes a transparent window covering a display screen, and the window serves to protect the display device from external impact, scratches applied during the use, and the like.

Glass or tempered glass which is a material having excellent mechanical properties is generally used for a window for displays, and in the case of conventional glass, a higher weight of a display device is caused due to the weight of glass.

In order to solve the problems described above, a technology of thinning a glass substrate has been developed, but there are problems to be solved in that the glass substrate is still vulnerable to external impact so that it is difficult to implement unbreakable properties, and has low flame retardancy so that it is vulnerable to fire.

Accordingly, as a new glass substrate multilayer structure to be used in a display panel, the development of a new glass substrate multilayer structure which has mechanical properties such as shattering resistance to external impact and flammability resistance while having strength or scratch resistance corresponding to existing tempered glass is demanded.

In addition, the development of a new glass substrate multilayer structure, which has improved optical properties such as photoisotropy, visibility, and transparency while satisfying the above physical properties, is needed.

SUMMARY OF THE INVENTION

An embodiment is directed to providing a glass substrate multilayer structure having excellent mechanical properties and optical properties.

Another embodiment is directed to providing a method for manufacturing the glass substrate multilayer structure.

Still another embodiment is directed to providing a display panel using the glass substrate multilayer structure.

In one general aspect, a glass substrate multilayer structure includes: a glass substrate; a polyimide-based shatter-proof layer formed on one surface of the glass substrate; and a hard coating layer formed on the polyimide-based shatter-proof layer.

In the glass substrate multilayer structure, the polyimide-based shatter-proof layer may have a thickness of 5 to 50 µm, the hard coating layer may have a thickness of 5 to 20 µm, and the glass substrate multilayer structure may have a retardation in a thickness direction ($R_{th}$) of 200 nm or less.

The retardation may be specifically 100 nm or less, more specifically 50 nm or less, and more specifically 20 nm or less.

The polyimide-based shatter-proof layer may include a polyimide polymer including a unit derived from an aromatic diamine and an aromatic dianhydride.

The polyimide-based shatter-proof layer may further include a polyfunctional (meth)acrylic crosslinked polymer.

The hard coating layer may include a unit derived from a condensate of alkoxysilane having an epoxy group.

The condensate of alkoxysilane having an epoxy group may be a silsesquioxane resin having an epoxy group.

The hard coating layer may further include a unit derived from a crosslinking agent having a polyfunctional epoxy group.

The glass substrate may have a thickness of 100 to 1000 µm.

The glass substrate multilayer structure may have a flame retardant grade of V-0 as evaluated in accordance with a UL-94 VB flame retardant specification.

A surface of the hard coating layer of the glass substrate multilayer structure may have a surface hardness in accordance with ASTM D3363 of 4 H or more.

In another general aspect, a method for manufacturing a glass substrate multilayer structure includes: applying a shatter-proof layer forming composition on one surface of a glass substrate and curing the composition to form a polyimide-based shatter-proof layer; and applying a hard coating layer forming composition on the polyimide-based shatter-proof layer and curing the composition to form a hard coating layer.

In the method for manufacturing a glass substrate multilayer structure, the polyimide-based shatter-proof layer of the glass substrate multilayer structure may have a thickness of to 50 µm, the hard coating layer of the glass substrate multilayer structure may have a thickness of 5 to 20 µm, and the glass substrate multilayer structure may have a retardation in a thickness direction ($R_{th}$) of 200 nm or less, 100 nm or less, or 50 nm or less.

The shatter-proof layer forming composition may include a polyimide polymer including a unit derived from an aromatic diamine and an aromatic dianhydride.

The shatter-proof layer forming composition may further include a compound having a polyfunctional (meth)acryl group.

The hard coating layer forming composition may include a condensate of alkoxysilane having an epoxy group.

The condensate of alkoxysilane having an epoxy group may be a silsesquioxane resin having an epoxy group.

The hard coating layer forming composition may further include a crosslinking agent having a polyfunctional epoxy group.

The glass substrate multilayer structure may have a flame retardant grade of V-0 as evaluated in accordance with the UL-94 VB flame retardant specification.

A surface of the hard coating layer of the glass substrate multilayer structure may have a surface hardness in accordance with ASTM D3363 of 4 H or more, specifically 6 H or more.

Still another general aspect, a display panel includes the glass substrate multilayer structure described above.

Other features and aspects will be apparent from the following detailed description, the drawings, and the claims.

DESCRIPTION OF THE INVENTION

Hereinafter, a glass substrate multilayer structure, a method for manufacturing the same, and a display panel including the same according to an implementation will be described.

Herein, unless otherwise defined, all technical terms and scientific terms have the same meanings as those commonly understood by those skilled in the art to which the present disclosure pertains.

The terms used herein are only for effectively describing certain exemplary embodiments, and are not intended to limit the implementation.

Further, unless otherwise stated, the unit of added materials herein may be wt %.

In addition, the singular form used in the specification and claims appended thereto may be intended to also include a plural form, unless otherwise indicated in the context.

Throughout the specification, unless explicitly described to the contrary, "comprising" any constituent elements will be understood to imply further inclusion of other constituent elements rather than the exclusion of any other constituent elements.

Unless otherwise defined in the present specification, it will be understood that when a part such as a layer, a film, a thin film, a region, or a plate is referred to as being "on" or "above" another part, it may include not only the case of being "directly on" the other part but also the case of intervening another part therebetween.

Unless otherwise particularly defined in the present specification, a "combination thereof" refers to mixing or copolymerization of constituents.

Unless otherwise particularly defined in the present specification, the term "A and/or B" may refer to an embodiment including both A and B or an embodiment selecting one of A and B.

Unless otherwise particularly defined in the present specification, "polymer" may include an oligomer and a polymer, and may include a homopolymer and a copolymer. The oligomer may refer to a case in which the number of repeating units is 2 to 20, and the copolymer may include an alternating copolymer, a block copolymer, a random copolymer, a branch copolymer, a crosslinked copolymer, or all of them.

Hereinafter, unless otherwise particularly defined in the present specification, a polymer including "polyimide" or "polyimide-based" is a polymer including an imide structure, and is interpreted as including a polyimide-based or polyamideimide-based polymer.

Hereinafter, otherwise particularly defined in the present specification, "(meth)acryl" may be used in a meaning including both "methacryl" and "acryl".

Hereinafter, unless otherwise particularly defined in the present specification, a "mura phenomenon" may be interpreted as including all distortion phenomena by light which may be caused at a certain angle. For example, distortion by light, such as a black out phenomenon in which a screen looks black, a hot spot phenomenon, or a rainbow phenomenon having an iridescent stain, in a display device including a polyimide film may be included.

According to an exemplary embodiment, the glass substrate multilayer structure may have a multilayer structure including a glass substrate; a polyimide-based shatter-proof layer formed on one surface of the glass substrate; and a hard coating layer formed on the polyimide-based shatter-proof layer.

In the glass substrate multilayer structure, the polyimide-based shatter-proof layer may have a thickness of 5 to 50 μm, the hard coating layer may have a thickness of 5 to 20 μm, and the glass substrate multilayer structure may have a retardation in a thickness direction ($R_{th}$) of 200 nm or less, 100 nm or less, or more specifically 50 nm or less.

Here, the glass substrate, the polyimide-based shatter-proof layer, and the hard coating layer may be placed in order.

In addition, each layer may be placed directly in contact with each other, and another layer may be placed between each layer.

By satisfying the conditions, the glass substrate multilayer structure may have excellent adhesive strength between a glass substrate and a protective film, may implement excellent surface hardness and excellent shattering resistance to external impact, and may have excellent flammability resistance, even with a thin shatter-proof layer provided.

At the same time, a glass substrate multilayer structure, which has excellent photoisotropy, has no rainbow phenomenon to significantly improve visibility, and satisfies high light transmittance and low yellow index to have excellent transparency, may be provided.

The glass substrate multilayer structure may have a retardation in the thickness direction ($R_{th}$) of 200 nm or less, 150 nm or less, 100 nm or less, 50 nm or less, or 20 nm or less, the retardation in the thickness direction being measured by cutting the glass substrate multilayer structure into a certain size, measuring the thickness, measuring a retardation with Axoscan, and performing calibration in a C-plate direction for compensating for the retardation value.

Here, the retardation in the thickness direction ($R_{th}$) is calculated by the following Equation 1:

$$R_{th}=[(n_x+n_y)/2-n_z]\times d \quad \text{[Equation 1]}$$

wherein $n_x$ is a highest refractive index in in-plane refractive indexes, $n_y$ is a refractive index perpendicular to $n_x$ in the in-plane refractive indexes, $n_z$ is a refractive index in the direction perpendicular to the plane, and d is a value calculated by converting a thickness of a glass substrate multilayer structure to 10 μm.

When the retardation in the thickness direction ($R_{th}$) of the glass substrate multilayer structure satisfies the above range, photoisotropy is excellent, a rainbow phenomenon is not easily observed, and visibility is further improved, so that the glass substrate multilayer structure may be more appropriately used in a display panel, a device, and the like. Specifically, when the retardation is 50 nm or less, more specifically 20 nm or less, better characteristics may be shown.

In addition, the glass substrate multilayer structure may have a flame retardant grade of V-0, when the glass substrate multilayer structure is burned primarily and secondarily and a burning time and a glowing time are recorded, and evaluation is performed in accordance with the UL-94 VB flame retardant standard.

The glass substrate multilayer structure satisfying the flame retardant grade has further improved flammability resistance to further improve the problem in which a display panel is broken by external impact and the like to easily cause fire.

In addition, a hard coating surface of the glass substrate multilayer structure may have a surface hardness in accordance with ASTM D3363 of 4 H or more, specifically 4 H to 9 H, and more specifically 6 H to 9 H, but is not necessarily limited thereto. When the surface hardness satisfies the above range, the glass substrate multilayer structure has better strength and may prevent surface damage by external impact more significantly.

In addition, the glass substrate multilayer structure may have a total light transmittance of 90% or more as measured at 400 to 700 nm, a yellow index of 3.0 or less, specifically 2.0 or less as measured in accordance with ASTM E313, but the present disclosure is not necessarily limited thereto.

By having the optical properties in the above ranges, the glass substrate multilayer structure has excellent transparency, so that it may be used in a display device more appropriately.

Hereinafter, each component of a glass substrate, a polyimide-based shatter-proof layer, and a hard coating layer included in the glass substrate multilayer structure will be described in more detail. However, these are only illustrative and the present disclosure is not limited to the specific embodiments which are illustratively described.

<Glass Substrate>

The glass substrate may be formed on one surface of a display panel, and may have transparency, mechanical strength, thermal stability, moisture shielding properties, isotropy, and the like.

The glass substrate is mounted on means of transportation such as vehicles, trains, and aircraft, and may be used in an enclosed space.

Therefore, the glass substrate may not be easily broken by external impact, so that it may be formed on one surface of medium and large display panels which are often exposed to external impact, fire, or the like, and may have a thickness of 100 to 1000 µm, specifically 500 to 1000 µm, but is not necessarily limited thereto.

The glass substrate may further include a chemical reinforcement layer, and the chemical reinforcement layer may be formed by performing a chemical strengthening treatment on any one or more surfaces of both surfaces of the glass substrate, and thus, the strength of the glass substrate may be further improved.

As such, there are various methods of forming the chemically strengthened glass substrate, and as an example, an original long glass having a thickness of 100 µm or more may be prepared, processed into a predetermined shape by cutting, chamfering, sintering, and the like, and chemically strengthened, but the present disclosure is not necessarily limited thereto.

<Polyimide-Based Shatter-Proof Layer>

The polyimide-based shatter-proof layer may be placed on one surface of the glass substrate.

In addition to a basic function of absorbing energy generated upon breakage of the glass substrate to prevent debris shattering, the polyimide-based shatter-proof layer may improve flammability resistance, improve photoisotropy, and further improve optical properties such as visibility and transparency, and thus, it is important to satisfy the physical properties.

The polyimide-based shatter-proof layer may have a thickness of 5 to 50 µm, or 5 to 20 µm.

By coating the glass substrate with the polyimide-based shatter-proof layer, excellent shattering resistance and surface hardness of the glass substrate multilayer structure may be maintained while the polyimide-based shatter-proof layer having a relatively small thickness in the above range is included.

In addition, the glass substrate multilayer structure includes the polyimide-based shatter-proof layer having the thickness described above, whereby the glass substrate multilayer structure may have better visibility such as better photoisotropy and reduced rainbow phenomenon and may have further improved optical properties such as light transmittance and yellow index.

The polyimide-based shatter-proof layer may be a shatter-proof layer including a polyimide-based polymer, specifically a polyimide-based polymer containing a fluorine element, and is formed on the glass substrate with a hard coating layer described later, thereby further improving shattering resistance and flammability resistance to external impact and fire and highly implementing an effect of excellent photoisotropy.

The polyimide-based shatter-proof layer may include a polyimide-based polymer including a unit derived from an aromatic diamine and an aromatic dianhydride.

The aromatic diamine as a monomer of the polyimide-based polymer may be a fluorine-based aromatic diamine containing a fluorine element, but is not necessarily limited thereto, and when a fluorine-based diamine is used, mechanical properties such as excellent surface hardness, shattering resistance, and flammability resistance and optical properties such as photoisotropy, visibility, and transparency may be further improved, and deformation of the glass substrate may be further prevented.

The fluorine-based aromatic diamine may be any one or a mixture of two or more selected from 1,4-bis(4-amino-2-trifluoromethylphenoxy)benzene (6FAPB), 2,2'-bis(trifluoromethyl)benzidine (TFMB), and 2,2'-bis(trifluoromethyl)-4,4'-diaminodiphenyl ether (6FODA), but is not necessarily limited thereto.

In addition, the fluorine-based aromatic diamine may be mixed with other known aromatic diamine components, but the present disclosure is not necessarily limited thereto. By using the fluorine-based aromatic diamine as such, the optical properties of the glass substrate multilayer structure including the polyimide-based shatter-proof layer may be further improved, and a light transmittance, a yellow index, and the like may be further improved.

The aromatic dianhydride may be an aromatic dianhydride connected by an ether or ester group, and when manufactured into a film, a retardation in the thickness direction may be further decreased. An example of the aromatic dianhydride may include ether-based aromatic dianhydrides such as polyalkyleneglycolbis(anhydrotrimellitate) or ester-based aromatic dianhydrides, and may include ethylene glycol bis(anhydrotrimellitate) (TMEG100), TMEG200, TMEG500, and bis(1,3-dioxo-1,3-dihydroisobenzofuran-5-carboxylic acid) 1,4-pehnylene ester (TAHQ), without limitation.

Another example of the aromatic dianhydride may include any one or a mixture of two or more selected from 4,4'-hexafluoroisopropylidene diphthalic anhydride (6FDA), oxydiphthalic dianhydride (ODPA), sulfonyldiphthalicanhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhdrdide (TDA), 1,2,4,5-benzenetetracarboxylic dianhydride (PMDA), benzophenonetetracarboxylic dianhydride (BTDA), bis(carboxyphenyl) dimethylsilane dianhydride (SiDA), bis(dicarboxyphenoxy)diphenylsulfide dianhydride (BDSDA), and the like, but is not necessarily limited thereto.

A solvent for preparing the polyimide-based polymer is not particularly limited, but for example, by using a polar aprotic solvent, better solubility properties may be shown. An example of the polymerization solvent may include a solvent selected from N,N-dimethylpropionamide, dimethylacetamide, dimethylformamide, and the like, or a mixed solvent thereof, but is not particularly limited as long as a polyimide-based polymer or a monomer thereof is dissolved therein.

The polyimide-based shatter-proof layer may further include a polyfunctional (meth)acrylic crosslinked polymer.

When the polyimide-based shatter-proof layer further includes the polyfunctional (meth)acrylic crosslinked polymer, adhesive strength between a glass substrate and a protective film may be further improved, surface hardness and excellent shattering resistance to external impact may be more highly implemented, and flammability resistance may be further improved.

In addition, optical properties such as photoisotropy, visibility, and transparency may be also further improved.

Here, the polyfunctional (meth)acrylic crosslinked polymer may be formed by deriving crosslinking polymerization of the polyfunctional (meth)acrylic compound by means such as heating.

In addition, the crosslinking polymerization may be full crosslinking or partial crosslinking of the polyfunctional (meth)acrylic compound, but the present disclosure is not necessarily limited thereto.

The polyfunctional (meth)acrylic compound is a compound having a polyfunctional (meth)acryl group, and the (meth)acryl group may be, for example, a (meth)acrylate group.

In addition, the polyfunctional (meth)acrylic crosslinked polymer may be dispersed in a polyimide matrix resin of the shatter-proof layer to form a composite.

The polyfunctional (meth)acrylic crosslinked polymer may further include an alkylene group, an ether group, a urethane group, an ester group, or a combination thereof, but is not necessarily limited thereto, In addition, the polyfunctional (meth)acrylic crosslinked polymer may include a structural unit derived from a polyfunctional (meth)acrylic compound having 3 to 6 (meth) acryl groups, but is not necessarily limited thereto.

More specifically, the polyfunctional (meth)acrylic crosslinked polymer may include a structural unit derived from a polyfunctional (meth)acrylic compound such as a monomer having a polyfunctional (meth)acryl group and an oligomer having a polyfunctional (meth)acryl group, but is not necessarily limited thereto.

The polyfunctional (meth)acrylic compound may include trimethylolpropane tri(meth)acrylate, trimethylolethane tri(meth)acrylate, 1,2,4-cyclohexane tetra(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexa(meth)acrylate, polyfunctional urethane (meth)acrylate, polyfunctional polyester (meth)acrylate, or a combination thereof.

<Hard Coating Layer>

The hard layer may protect the polyimide-based shatter-proof layer having excellent optical and mechanical properties from external physical and chemical damage.

The hard coating layer may be formed by curing a hard coating layer forming composition, and also, may be a composite hard coating layer obtained by photocuring and then thermally curing the hard coating layer forming composition, but is not necessarily limited thereto.

The hard coating layer may be, for example, an organic cured layer in various forms such as an epoxy cured layer or a vinyl group cured layer, but is not limited thereto.

The hard coating layer may have a thickness of 5 to 20 μm, specifically 5 to 15 μm. By including the hard coating layer having the thickness in the range described above, the glass substrate multilayer structure may have better surface hardness and shattering resistance, and further prevent deterioration of photoisotropy and visibility.

The hard coating layer is not particularly limited as long as it is formed on the polyimide-based shatter-proof layer and may protect the polyimide-based shatter-proof layer from the outside. Specifically, the hard coating layer may include any one or more polymers selected from an acrylic polymer, a silicon-based polymer, an epoxy-based polymer, a urethane-based polymer, and the like.

The hard coating layer may include a unit derived from a condensate of alkoxysilane having an acryl or epoxy group. For example, the condensate of alkoxysilane having an epoxy group used as the hard coating layer may be a siloxane-based resin having an epoxy group, but is not necessarily limited thereto.

The hard coating layer includes the unit derived from a condensate of alkoxysilane having an epoxy group, whereby the glass substrate multilayer structure including the hard coating layer may show better hardness after curing.

The epoxy group may be any one or more selected from a cyclic epoxy group, an aliphatic an epoxy group, and an aromatic epoxy group, and the siloxane-based resin may refer to a polymer compound including a moiety in which a silicon atom and an oxygen atom form a covalent bond.

The condensate of alkoxysilane having an epoxy group may be a silsesquioxane resin having an epoxy group. Specifically, the condensate may be a silsesquioxane resin in which an epoxy group is directly substituted on a silicon atom of the silsesquioxane resin, or an epoxy group is substituted on a substituent of the silicon atom. As a specific example, the condensate of alkoxysilane having an epoxy group may be a silsesquioxane resin substituted by 2-(3,4-epoxycyclohexyl), but is not necessarily limited thereto.

The condensate of alkoxysilane having an epoxy group may have a weight average molecular weight of 1,000 to 20,000 g/mol, specifically 1,000 to 18,000 g/mol, and more specifically 2,000 to 15,000 g/mol. When the weight average molecular weight is in the range described above, the flowability, coatability, curing reactivity, and the like of the hard coating layer forming composition may be further improved.

The condensate of alkoxysilane having an epoxy group may include a repeating unit derived from an alkoxysilane compound represented by the following Chemical Formula 1:

$$R^1{}_n Si(OR^2)_{4-n} \qquad \text{[Chemical Formula 1]}$$

wherein $R^1$ is a linear or branched alkyl group having 1 to 6 carbon atoms substituted with an epoxycycloalkyl group having 3 to 6 carbon atoms or an oxiranyl group, in which the alkyl group may include an ether group, $R^2$ is a linear or branched alkyl group having 1 to 7 carbon atoms, and n is an integer of 1 to 3.

The alkoxysilane compound represented by Chemical Formula may be, for example, 2-(3,4-epoxycyclohexyl)

ethyltrimethoxysilane, 2-(3,4-epoxycyclohexyl)ethyltriethoxysilane, 3-glycidoxypropyltrimethoxysilane, and the like and may be used alone or in combination of two or more, but is not necessarily limited thereto.

The condensate of alkoxysilane having an epoxy group may be included at 20 to 70 parts by weight, specifically 20 to 50 parts by weight with respect to 100 parts by weight of the hard coating layer forming composition described later, but is not necessarily limited thereto. When the above range is satisfied, the hard coating layer forming composition may secure better flowability and coating property. In addition, the hard coating layer forming composition may be uniformly cured at the time of curing, so that physical defects such as cracks due to overcuring may be more effectively prevented, and a hard coating layer manufactured therefrom may show better hardness.

The hard coating layer may further include a unit derived from a crosslinking agent having a polyfunctional epoxy group. The crosslinking agent may form crosslinks with the condensate of alkoxysilane having an epoxy group to solidify the hard coating layer forming composition and further improve the hardness of the hard coating layer.

The crosslinking agent may include a compound having an alicyclic epoxy group. For example, the crosslinking agent may include a compound in which two 3,4-epoxycyclohexyl groups are connected to each other, but is not necessarily limited thereto. The crosslinking agent may have similar structure and nature to the condensate of alkoxysilane having an epoxy group, and in this case, the crosslinking agent may further promote the crosslink of the condensate of alkoxysilane having an epoxy group and maintain the composition at a more appropriate viscosity.

The content of the crosslinking agent is not particularly limited, and for example, may be 5 to 150 parts by weight with respect to 100 parts by weight of the condensate of alkoxysilane having an epoxy group, but is not necessarily limited thereto. When the content of the crosslinking agent is within the above range, the viscosity of the composition may be maintained in an appropriate range, and coatability and curing reactivity may be more improved.

In addition, the hard coating layer may further include an inorganic filler. An example of the inorganic filler may include metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, alone or in combination of two or more, but is not necessarily limited thereto. A hard coating layer further including the inorganic filler may have further improved flame retardant properties.

In addition, the hard coating layer may further include a lubricant. The lubricant may improve winding efficiency, blocking resistance, wear resistance, scratch resistance, and the like. An example of the lubricant may include waxes such as polyethylene wax, paraffin wax, synthetic wax, or Montan wax; synthetic resins such as a silicone-based resin or a fluorine-based resin; and the like, alone or in combination of two or more, but is not necessarily limited thereto.

In addition, the hard coating layer forming composition may include a photoinitiator or may include the photoinitiator and a thermal initiator represented by the following Chemical Formula 2:

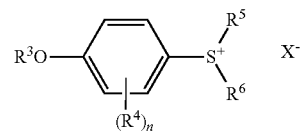

[Chemical Formula 2]

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxy portion of the alkoxycarbonyl group has 1 to 4 carbon atoms, and an example of the alkoxycarbonyl group may include a methoxycarbonyl group, an ethoxycarbonyl group, a propoxycarbonyl group, and the like.

The alkyl portion of the alkylcarbonyl group has 1 to 4 carbon atoms, and an example of the alkylcarbonyl group may include an acetyl group, a propionyl group, and the like.

The aryl portion of the arylcarbonyl group has 6 to 14 carbon atoms, and an example of the arylcarbonyl group may include a benzoyl group, a 1-naphthylcarbonyl group, a 2-naphthylcarbonyl group, and the like.

An example of the aralkyl group may include a benzyl group, a 2-phenylethyl group, a 1-naphthylmethyl group, a 2-naphthylmethyl group, and the like.

By using the compound of Chemical Formula 2 as a thermal initiator, a cure half-life may be shortened and thermal curing may be more rapidly performed even in low-temperature conditions, and thus, damage and deformation occurring when a long-term heat treatment is performed under high-temperature conditions may be further prevented.

The thermal initiator may promote the crosslinking reaction of the condensate of alkoxysilane having an epoxy group or the crosslinking agent later when heat is applied to the hard coating layer forming composition. As the thermal initiator, a cationic thermal initiator may be used, but the present disclosure is not necessarily limited thereto.

In addition, photocuring using the photoinitiator is used in combination with the thermal curing using the thermal initiator, thereby further improving the curing degree, the hardness, and the like of the hard coating layer. For example, the hard coating layer forming composition is applied to the polyimide-based shatter-proof layer and irradiated with ultraviolet rays (photocuring) to at least partially cure the composition, and then heat is further applied (thermal curing) to substantially completely cure the composition.

The hard coating layer forming composition may be semi-cured or partially cured by the photocuring, and the semi-cured or partially cured hard coating layer forming composition may be substantially completely cured by the thermal curing.

For example, when the hard coating layer forming composition is cured only by photocuring, a curing time is excessively extended, or in part, curing may not be completely performed. However, when the photocuring is followed by the thermal curing, the portion which is not cured by the photocuring may be substantially completely cured by the thermal curing, and the curing time may be also reduced.

Though the method for first photocuring the hard coating layer forming composition and performing further thermal curing has been described above, the sequence of the photocuring and the thermal curing is not particularly limited thereto. That is, in some exemplary embodiments, the thermal curing may be first performed and then the photocuring may be performed, of course.

In some exemplary embodiments, the thermal initiator may be included at 0.1 to 20 parts by weight, and more specifically 1 to 20 parts by weight with respect to 100 parts by weight of the condensate of alkoxysilane having an epoxy group, but is not necessarily limited thereto. When the content of the thermal initiator is within the range, the thermal curing reaction may proceed at a more effective rate, and deterioration of the mechanical properties of the hard coating layer may be further prevented.

In addition, for example, the thermal initiator may be included at 0.01 to 15 parts by weight, specifically 0.1 to 15 parts by weight, and more specifically 0.3 to 10 parts by weight with respect to a total of 100 parts by weight of the hard coating layer forming composition, but is not necessarily limited thereto.

The photoinitiator may include a photo-cationic initiator. The photo-cationic initiator may initiate polymerization of the condensate of alkoxysilane having an epoxy group and an epoxy-based monomer.

As the photo-cationic initiator, an onium salt and/or an organic metal salt, and the like may be used, and for example, a diaryliodonium salt, triarylsulfonium salt, an aryldiazonium salt, an iron-arene composite, and the like may be used alone or in combination of two or more, but the present disclosure is not necessarily limited thereto.

The content of the photoinitiator is not particularly limited, but for example, the photoinitiator may be included at 0.1 to 15 parts by weight, specifically 1 to 15 parts by weight with respect to 100 parts by weight of the condensate of alkoxysilane having an epoxy group, but is not necessarily limited thereto. When the content of the photoinitiator is within the above range, better curing efficiency of the hard coating layer forming composition may be maintained, and deterioration of the physical properties due to residual components after curing may be prevented.

In addition, for example, the photoinitiator may be included at 0.01 to 10 parts by weight, specifically 0.1 to 10 parts by weight, and more specifically 0.3 to 5 parts by weight with respect to a total of 100 parts by weight of the hard coating layer forming composition, but is not necessarily limited thereto.

The hard coating layer forming composition may further include a thermal curing agent.

The thermal curing agent may include amine-based, imidazole-based, acid anhydride-based, amide-based thermal curing agents, and the like, and more specifically, an acid anhydride-based thermal curing agent may be further used in terms of discoloration prevention and high hardness implementation, and these may be used alone or in combination of two or more, but the present disclosure is not necessarily limited thereto.

The content of the thermal curing agent is not particularly limited, and for example, may be included at 5 to 30 parts by weight with respect to 100 parts by weight of the condensate of alkoxysilane having an epoxy group, but is not necessarily limited thereto. When the content of the thermal curing agent is within the above range, the hardness efficiency of the hard coating layer forming composition may be further improved to form a hard coating layer having better hardness.

The hard coating layer forming composition may further include a solvent. The solvent is not particularly limited and a solvent known in the art may be used.

A non-limiting example of the solvent may include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 to 200 parts by weight, based on 100 parts by weight of the condensate of alkoxysilane having an epoxy group. When the above range is satisfied, the hard coating layer forming composition may secure an appropriate level of viscosity, and workability at the time of forming the hard coating layer may be better. In addition, it is easy to adjust the thickness of the hard coating layer, and the solvent drying time is reduced, whereby a more rapid process speed may be secured.

The solvent may be included at a residual amount excluding the amounts of other components in the total weight of the predetermined entire hard coating layer forming composition. For example, when the total weight of the predetermined entire composition is 100 g and the sum of the weights of the components other than the solvent is 70 g, 30 g of the solvent will be included, but the present disclosure is not necessarily limited thereto.

The hard coating layer forming composition may further include an inorganic filler. The inorganic filler may further improve the hardness of the hard coating layer.

The inorganic filler is not particularly limited, and an example thereof may include metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, and in terms of commerciality with other components of the hard coating layer forming composition, silica may be used, and these may be used alone or in combination of two or more, but the present disclosure is not necessarily limited thereto.

The hard coating layer forming composition may further include a lubricant. The lubricant may further improve winding efficiency, blocking resistance, wear resistance, scratch resistance, and the like.

The kind of lubricant is not particularly limited, and for example, waxes such as polyethylene wax, paraffin wax, synthetic wax, or Montan wax; synthetic resins such as silicon-based resin and fluorine-based resin; and the like may be used, and these may be used alone or in combination of two or more, but the present disclosure is not necessarily limited thereto.

Besides, the hard coating layer forming composition may further include additives such as, for example, an antioxidant, a UV absorber, a photostabilizer, a thermal polymerization inhibitor, a leveling agent, a surfactant, a lubricant, and an antifouling agent.

<Display Panel>

Another implementation may provide a display panel or a display device including the glass substrate multilayer structure.

Here, the glass substrate multilayer structure may be used as an outermost surface window cover of the display device. The display device may be various image display devices such as a common liquid crystal display device, an electroluminescent display device, a plasma display device, and a field emission display device.

The glass substrate multilayer structure may prevent a shattering phenomenon by external impact or an outbreak of fire by excellent shattering resistance and flammability resistance, and also, excellent photoisotropy, visibility, transparency, and the like at a level which is very suitable for use in a display device may be implemented.

Accordingly, the glass substrate may be very suitable for use as an outermost surface window cover which is mounted on means of transportation such as vehicles, trains, and aircraft, is used in an enclosed space, and protects medium and large display devices which are often exposed to external impact, fire, and the like.

<Method for Manufacturing Glass Substrate Multilayer Structure>

Another implementation provides a method for manufacturing the glass substrate multilayer structure described above.

The method for manufacturing a glass substrate multilayer structure includes: applying a shatter-proof layer forming composition on one surface of a glass substrate and curing the composition to form a polyimide-based shatter-proof layer; and applying a hard coating layer forming composition on the polyimide-based shatter-proof layer and curing the composition to form a hard coating layer.

The polyimide-based shatter-proof layer may have a thickness of 5 to 50 μm, the hard coating layer may have a thickness of 5 to 20 μm, and the glass substrate multilayer structure may have a retardation in a thickness direction ($R_{th}$) of 200 nm or less.

Since the thickness of each layer and the physical properties of the glass substrate multilayer structure are as described above for the glass substrate multilayer structure, the detailed description thereof will be omitted.

First, a method for forming a polyimide-based shatter-proof layer will be described.

The polyimide-based shatter-proof layer may be formed by applying the shatter-proof layer forming composition on a glass substrate and then curing the composition. That is, the polyimide-based shatter-proof layer may be formed by a solution casting method. Here, the application method may be any one selected from bar coating, dip coating, die coating, gravure coating, comma coating, and slit coating, or a combination thereof, but is not necessarily limited thereto.

When the polyimide-based shatter-proof layer is formed by the solution casting method as described above, the shatter-proof layer may be thinned while the shattering resistance, the flammability resistance, the photoisotropy, and the like of the glass substrate multilayer structure including the shatter-proof layer are maintained excellent, and the thickness of the shatter-proof layer or the glass substrate multilayer structure including the same may be minimized.

Therefore, a display panel, a display device, or the like including the glass substrate multilayer structure may be slimmed or made lighter, and the display panel, the display device, or the like may be very suitable for use in medium and large display devices mounted on means of transportation such as vehicles, trains, and aircraft, and its use may be further improved.

The curing may be a heat treatment at a temperature of 50 to 250° C., the number of heat treatments may be one or more, and the heat treatment may be performed once or more at the same temperature or in different temperature ranges, but is only a non-limiting example, and the present disclosure is not necessarily limited thereto. In addition, the heat treatment time may be 1 minute to 60 minutes, but is not necessarily limited thereto.

Hereinafter, a method for forming the hard coating layer will be described. The hard coating layer may be formed by applying the hard coating layer forming composition on the polyimide-based shatter-proof layer and curing the composition. Here, the application method may be any one selected from bar coating, dip coating, die coating, gravure coating, comma coating, and slit coating, or a combination thereof, but is not necessarily limited thereto.

Curing in the hard coating layer formation may be performed by photocuring or thermal curing alone, photocuring followed by thermal curing, thermal curing followed by photocuring, or the like, but is not necessarily limited thereto.

As an example, a step of pretreatment by heating the hard coating layer forming composition before the photocuring may be further included, and the pretreatment may be performed at a lower temperature than the thermal curing, but is not necessarily limited thereto.

Hereinafter, the present disclosure will be described in more detail with reference to the examples and the comparative examples. However, the following examples and comparative examples are only one example for describing the present disclosure in more detail, and do not limit the present disclosure in any way.

[Method for Measuring Physical Properties]

(1) Surface Hardness

A pencil hardness on a surface of the glass substrate multilayer structures manufactured in the examples and the comparative examples was measured using pencils by hardness (Mitsubishi Pencil Co., Ltd.) under a load of 750 gf using a pencil hardness tester (Kipae E&T Co. Ltd.), in accordance with ASTM D3363. At this time, the surface of the glass substrate multilayer structure on which the measurement was performed was the surface on which a hard coating layer was formed.

(2) Retardation ($R_{th}$)

The retardation was measured using Axoscan. The glass substrate multilayer structures manufactured in the following examples and comparative examples were cut into a certain size, the thickness thereof was measured, the retardation was measured with Axoscan, and the measured thickness (nm) was input while performing calibration in a C-plate direction for compensating for the retardation value.

$$R_{th}=[(n_x+n_y)/2-n_z]\times d \qquad \text{[Equation 1]}$$

wherein $n_x$ is a highest refractive index in in-plane refractive indexes, $n_y$ is a refractive index perpendicular to $n_x$ in the in-plane refractive indexes, $n_z$ is a refractive index in the direction perpendicular to the plane, and d is a value calculated by converting a thickness of a glass substrate multilayer structure to 10 μm.

(3) Rainbow Phenomenon

A polarizing film (Nitto Denko Corporation) was attached to one surface of the glass substrate multilayer structures manufactured in the following examples and the comparative examples, and evaluation was performed by the following criteria, depending on whether a rainbow was seen, when the plate was visually observed at a viewing angle of 60°.

<Evaluation Criteria>
OK: no rainbow and uniform color shown
NG: strong rainbow and strong color shown
(4) Flame Retardant Grade The glass substrate multilayer structures manufactured in the following examples and the comparative examples were burned primarily and secondarily, the burning time and the glowing time were recorded, and evaluation was performed by a flame retardant grade in accordance with the UL-94 VB flame retardant specification.

(5) Shattering Resistance

After a steel ball (weight: 500 g) was dropped on the glass substrate multilayer structures manufactured in the following examples and the comparative examples from a height of 3 m, the substrate state was evaluated by the following criteria. At this time, the steel ball was dropped on a surface having a hard coating layer formed thereon.

<Evaluation Criteria>
OK: a weight difference of the glass substrate multilayer structure before and after dropping the steel ball was less than 0.01 g (no shattering).

NG: a weight difference of the glass substrate multilayer structure before and after dropping the steel ball was 0.01 g or more.

(6) Light Transmittance

The total light transmittance was measured at the entire wavelength region of 400 to 700 nm using a spectrophotometer (Nippon Denshoku, COH-400) on a film having a thickness of 50 µm, in accordance with the ASTM D1746 specification. The unit is %.

(7) Yellow Index (YI)

The yellow index was measured using a spectrophotometer (from Nippon Denshoku, COH-5500) in accordance with the ASTM E313 specification.

PREPARATION EXAMPLE 1

Preparation of Shatter-Proof Layer Forming Composition

An agitator in which a nitrogen stream flowed was filled with 267 g of N,N-dimethylpropionamide (DMPA), and 39 g of 2,2'-Bis(trifluoromethyl)benzidine (TFMB) was dissolved therein while the temperature of the reactor was maintained at 25° C. 50 g of ethylene glycol bis-anhydro trimellitate (TMEG100) was added to the TFMB solution at the same temperature, and polymerization was performed while stirring was performed for 48 hours. Finally, dimethylpropaneamide (DMPA) was added so that the solid content concentration was 20 wt %, thereby preparing a polyamic acid solution which was a precursor of the shatter-proof layer forming composition.

To the polyimide-based resin solution, an organic additive (dipentaerythritol hexaacrylate (DPHA), 50%) was added so that it was 15 wt % with respect to the solid content to prepare the shatter-proof layer forming composition.

COMPARATIVE PREPARATION EXAMPLE 1

Preparation of Shatter-Proof Layer Forming Composition 61.9 mg of a Grubbs catalyst and 10 ml of methylene chloride (MC) were added to a reactor under a nitrogen atmosphere, stirring was performed for 12 hours, 0.8 g of dicyclopentadiene dissolved in 10 ml of methylene chloride (MC) was added to the reactor, and the reaction was performed at room temperature for 2 hours.

After the reaction was finished, the reaction solution was transferred to a high-pressure reactor, 100 ml of MC, 0.014 ml of triethylamine, and 0.01 ml of MeOH were added to the reaction solution, hydrogen gas ($H_2$ (g)) at a pressure of 100 psi was added, the temperature was raised up to 60° C., and stirring was performed for 12 hours, thereby preparing a shatter-proof layer forming composition.

PREPARATION EXAMPLE 2

Preparation of Hard Coating Layer Forming Composition)

2-(3,4-epoxycyclohexyl)ethyltrimethoxysilane (ECTMS, TCI) and water were mixed at a ratio of 24.64 g:2.70 g (0.1 mol: 0.15 mol) to prepare a reaction solution and the reaction solution was added to a 250 mL 2-neck flask. 0.1 mL of a tetramethylammonium hydroxide catalyst (Aldrich) and 100 mL of tetrahydrofuran (Aldrich) were added to the mixture and stirring was performed at 25° C. for 36 hours.

Thereafter, layer separation was performed and a product layer was extracted with methylene chloride (Aldrich), moisture was removed from the extract with magnesium sulfate (Aldrich), and the solvent was dried under vacuum to obtain an epoxy siloxane-based resin.

30 g of the epoxy siloxane-based resin as prepared above, g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl) [4-(2-methylpropyl)phenyl]iodoniumhexafluorophosphate as a photoinitiator, and 54.5 g of methyl ethyl ketone were mixed, thereby preparing a hard coating layer forming composition.

<Manufacture of Glass Substrate Multilayer Structure>

EXAMPLE 1

On one surface of a glass substrate having a thickness of 700 µm, the shatter-proof layer forming composition prepared in Preparation Example 1 was applied using a doctor blade, and the composition was dried at 80° C. for 10 minutes and at 230° C. for 10 minutes under a nitrogen atmosphere, thereby forming a shatter-proof layer having a thickness of 5 µm. Then, on the shatter-proof layer, the hard coating layer forming composition prepared in Preparation Example 2 was applied using a #10 Mayer bar, and dried at 60° C. for 3 minutes. Thereafter, UV rays were irradiated at 1 J/cm$^2$ using a high pressure metal lamp, and curing was performed at 150° C. for 10 minutes, thereby manufacturing a glass substrate multilayer structure having a hard coating layer having a thickness of 10 µm formed thereon. The results are listed in Table 1.

EXAMPLE 2

A glass substrate multilayer structure was manufactured in the same manner as in Example 1, except that the thickness of the shatter-proof layer was 11 µm. The results are listed in Table 1.

EXAMPLE 3

A glass substrate multilayer structure was manufactured in the same manner as in Example 1, except that the thickness of the shatter-proof layer was 20 µm. The results are listed in Table 1.

EXAMPLE 4

A glass substrate multilayer structure was manufactured in the same manner as in Example 1, except that the thickness of the shatter-proof layer was 50 μm. The results are listed in Table 1.

COMPARATIVE EXAMPLE 1

A glass substrate multilayer structure was manufactured in the same manner as in Example 2, except that the shatter-proof layer was formed using the shatter-proof layer forming composition prepared in Comparative Preparation Example 1, instead of using the shatter-proof layer forming composition prepared in Preparation Example 1. The results are listed in Table 1.

COMPARATIVE EXAMPLE 2

A glass substrate multilayer structure was manufactured in the same manner as in Example 1, except that the thickness of the shatter-proof layer was 4 μm. The results are listed in Table 1.

COMPARATIVE EXAMPLE 3

A glass substrate multilayer structure was manufactured in the same manner as in Example 1, except that the thickness of the shatter-proof layer was 60 μm. The results are listed in Table 1.

COMPARATIVE EXAMPLE 4

A glass substrate multilayer structure was manufactured in the same manner as in Example 1, except that the thickness of the hard coating layer was 100 μm and the thickness of the shatter-proof layer was 11 μm. The results are listed in Table 1.

COMPARATIVE EXAMPLE 5

A glass substrate multilayer structure was manufactured in the same manner as in Example 1, except that the thickness of the shatter-proof layer was 11 μm and the thickness of the hard coating layer was 1 μm. The results are listed in Table 1.

Referring to Table 1 above, it was confirmed that the glass substrate multilayer structures of Examples 1 to 4 had excellent photoisotropy, had no rainbow phenomenon to be observed so that visibility was very good, and had a flame retardant grade of V-0 as evaluated in accordance with the UL-94 VB flame retardant specification so that flammability resistance was very good.

In addition, it was confirmed that the glass substrate multilayer structures of Examples 1 to 4 had no breakage even when a steel ball (weight: 500 g) was dropped from a height of 300 m, so that it had very good shattering resistance, and had a very good surface hardness of 4 H or more, and also had excellent optical properties such as light transmittance and yellow index (YI).

However, in Comparative Examples 1 to 5, the scope of thickness and the retardation values were out of the range described above, and thus, the physical properties satisfying no rainbow phenomenon occurrence and excellent visibility were not shown. In addition, it was confirmed that the glass substrate multilayer structure of Comparative Example 1 to which a COP film was applied as a shatter-proof layer had a flame retardant grade of V-3 as evaluated in accordance with the UL-94 VB flame retardant specification, so that flammability resistance was significantly lowered, and its surface hardness was deteriorated.

Accordingly, the glass substrate multilayer structures of Examples 1 to 4 included a polyimide-based shatter-proof layer having a thickness of 5 to 50 μm formed on one surface of a glass substrate and a hard coating layer having a thickness of 5 to 20 μm formed on the polyimide-based shatter-proof layer, and had a retardation in the thickness direction ($R_{th}$) of 200 nm or less, thereby improving a shattering phenomenon when the glass substrate is broken, securing users' safety since it is not easily burned by fire, significantly improving visibility with excellent photoisotropy, and having excellent surface properties and optical properties.

A glass substrate multilayer structure, which may secure excellent surface hardness, shattering resistance to external impact, and flammability resistance, does not cause a rainbow phenomenon, and has optical properties such as visibility, transparency, light transmittance, and yellow index, even with a thin shatter-proof layer provided, may be provided.

In addition, a method for manufacturing a glass substrate multilayer structure having the physical properties described above may be provided.

TABLE 2

| | Thickness of shatter-proof layer (μm) | Thickness of hard coating layer (μm) | $R_{th}$ (nm) | Rainbow phenomenon | Flame retardant grade | Surface hardness | Shattering resistance | Light transmittance (%) | Yellow index (YI) |
|---|---|---|---|---|---|---|---|---|---|
| Example 1 | 5 | 10 | 10 | OK | V-0 | 6H | OK | 90.8 | 1.1 |
| Example 2 | 11 | 10 | 20 | OK | V-0 | 5H | OK | 90.6 | 1.4 |
| Example 3 | 20 | 10 | 36 | OK | V-0 | 5H | OK | 90.9 | 1.6 |
| Example 4 | 50 | 10 | 79 | OK | V-0 | 4H | OK | 90.9 | 2.0 |
| Comparative Example 1 | 11 | 10 | 10 | OK | V-3 | 3H | OK | 89.8 | 1.5 |
| Comparative Example 2 | 4 | 10 | 39 | OK | V-0 | 3H | NG | 91.0 | 1.3 |
| Comparative Example 3 | 60 | 10 | 90 | NG | V-0 | 4B | OK | 89.6 | 2.3 |
| Comparative Example 4 | 11 | 100 | 201 | NG | V-0 | 5H | NG | 90.5 | 1.5 |
| Comparative Example 5 | 11 | 1 | 109 | OK | V-0 | 6B | OK | 90.8 | 1.9 |

Hereinabove, although the present disclosure has been described by specified matters and specific exemplary embodiments, they have been provided only for assisting in the entire understanding of the present disclosure. Therefore, the present disclosure is not by the specific matters limited to the exemplary embodiments. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scope and spirit of the invention.

What is claimed is:

1. A glass substrate multilayer structure comprising:
a glass substrate;
a polyimide-based shatter-proof layer formed on one surface of the glass substrate; and
a hard coating layer formed on the polyimide-based shatter-proof layer,
wherein the polyimide-based shatter-proof layer has a thickness of 5 to 50 μm, the hard coating layer has a thickness of 5 to 20 μm, and the glass substrate multilayer structure has a retardation in a thickness direction (Rth) of 200 nm or less,
wherein the polyimide-based shatter-proof layer comprises a polyfunctional (meth)acrylic crosslinked polymer.

2. The glass substrate multilayer structure of claim 1, wherein the polyimide-based shatter-proof layer comprises a polyimide polymer comprising a unit derived from an aromatic diamine and an aromatic dianhydride.

3. The glass substrate multilayer structure of claim 1, wherein the hard coating layer comprises a unit derived from a condensate of alkoxysilane having an epoxy group.

4. The glass substrate multilayer structure of claim 3, wherein the condensate of alkoxysilane having an epoxy group is a silsesquioxane resin having an epoxy group.

5. The glass substrate multilayer structure of claim 3, wherein the hard coating layer further comprises a unit derived from a crosslinking agent having a polyfunctional epoxy group.

6. The glass substrate multilayer structure of claim 1, wherein the glass substrate has a thickness of 100 to 1000 μm.

7. The glass substrate multilayer structure of claim 1, wherein the glass substrate multilayer structure has a flame retardant grade of V-0 as evaluated in accordance with a UL-94 VB flame retardant specification.

8. The glass substrate multilayer structure of claim 1, wherein a surface of the hard coating layer of the glass substrate multilayer structure has a surface hardness in accordance with ASTM D3363 of 4H or more.

9. A method for manufacturing a glass substrate multilayer structure, the method comprising the steps of:
applying a shatter-proof layer forming composition on one surface of a glass substrate and curing the composition to form a polyimide-based shatter-proof layer; and
applying a hard coating layer forming composition on the polyimide-based shatter-proof layer and curing the composition to form a hard coating layer,
wherein the polyimide-based shatter-proof layer has a thickness of 5 to 50 μm, the hard coating layer has a thickness of 5 to 20 μm, and the glass substrate multilayer structure has a retardation in a thickness direction (Rth) of 200 nm or less thereof,
wherein the shatter-proof layer forming composition comprises a compound having a polyfunctional (meth)acryl group.

10. The method for manufacturing a glass substrate multilayer structure of claim 9, wherein the shatter-proof layer forming composition comprises a polyimide polymer comprising a unit derived from an aromatic diamine and an aromatic dianhydride.

11. The method for manufacturing a glass substrate multilayer structure of claim 9, wherein the hard coating layer forming composition comprises a condensate of alkoxysilane having an epoxy group.

12. The method for manufacturing a glass substrate multilayer structure of claim 11, wherein the condensate of alkoxysilane having an epoxy group is a silsesquioxane resin having an epoxy group.

13. The method for manufacturing a glass substrate multilayer structure of claim 11, wherein the hard coating layer forming composition further comprises a crosslinking agent having a polyfunctional epoxy group.

14. The method for manufacturing a glass substrate multilayer structure of claim 9, wherein the glass substrate multilayer structure has a flame retardant grade of V-0 as evaluated in accordance with a UL-94 VB flame retardant specification.

15. The method for manufacturing a glass substrate multilayer structure of claim 9, wherein a surface of the hard coating layer of the glass substrate multilayer structure has a surface hardness in accordance with ASTM D3363 of 4H or more.

16. A display panel comprising the glass substrate multilayer structure according to claim 1.

* * * * *